US012742628B2

(12) United States Patent
Wang et al.

(10) Patent No.: US 12,742,628 B2
(45) Date of Patent: Sep. 22, 2026

(54) DEVICE AND METHOD FOR MEASURING ROTATION ANGLE OF SPHERICAL HINGE JOINT WITH FOOTBALL-SHAPED STRUCTURE

(71) Applicant: Hangzhou Dianzi University, Hangzhou (CN)

(72) Inventors: Wen Wang, Hangzhou (CN); Wei Fang, Hangzhou (CN); Hao Huang, Hangzhou (CN); Wentao Jiang, Hangzhou (CN); He Yang, Hangzhou (CN); Keqing Lu, Hangzhou (CN); Zhanfeng Chen, Hangzhou (CN); Chuanyong Wang, Hangzhou (CN); Guang Shi, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 352 days.

(21) Appl. No.: 18/639,949

(22) Filed: Apr. 18, 2024

(65) Prior Publication Data

US 2024/0377181 A1 Nov. 14, 2024

(30) Foreign Application Priority Data

May 9, 2023 (CN) ........................ 202310516173.8

(51) Int. Cl.
*G01B 7/30* (2006.01)
*G01B 7/00* (2006.01)

(52) U.S. Cl.
CPC .............. *G01B 7/30* (2013.01); *G01B 7/002* (2013.01)

(58) Field of Classification Search
CPC ................................ G01B 7/002; G01B 7/30
USPC ................................................ 33/1 PT, 534
See application file for complete search history.

(56) References Cited

U.S. PATENT DOCUMENTS 4,497,118 A * 2/1985 Byrum .................... G01C 9/06 200/220
5,712,478 A * 1/1998 Olsson .................... G01B 7/30 356/614
5,848,477 A * 12/1998 Wiedmann .......... G01B 21/047 33/DIG. 1

(Continued)

FOREIGN PATENT DOCUMENTS

DE 4134690 A1 * 4/1993 ............ G01B 21/20

*Primary Examiner* — George B Bennett

(74) *Attorney, Agent, or Firm* — Bochner PLLC; Andrew D. Bochner

(57) ABSTRACT

A device and a method for measuring a rotation angle of a spherical hinge joint with a football-shaped structure are provided. The measuring device includes a driving electrode, and an induction electrode system. During measurement, the driving electrode and induction electrode system are both installed in a measured spherical hinge joint. The spherical hinge joint includes a ball socket base, and a ball head installed in the ball socket base. The driving electrode is fixed to the ball head. The induction electrode system includes multiple regular hexagonal spherical electrode plates, and one or more regular pentagonal spherical electrode plates. Five regular hexagonal spherical electrode plates are all arranged around any one regular pentagonal spherical electrode plate, respective regular hexagonal spherical electrode plates and respective regular pentagonal spherical electrode plate are assembled to form a spherical shell structure.

10 Claims, 6 Drawing Sheets

(56) References Cited

U.S. PATENT DOCUMENTS

| | | | | |
|---|---|---|---|---|
| 6,785,973 | B1 * | 9/2004 | Janssen | G01B 5/004<br>33/763 |
| 7,036,233 | B1 * | 5/2006 | Schindler | G01B 7/31<br>33/1 PT |
| 7,412,777 | B2 * | 8/2008 | Pelletier | A61B 90/36<br>33/520 |
| 7,743,524 | B2 * | 6/2010 | Eaton | G01B 21/047<br>33/503 |
| 7,913,404 | B1 * | 3/2011 | Smith | G01B 11/2755<br>33/391 |
| 2002/0083603 | A1 * | 7/2002 | Jang | G01C 15/002<br>33/286 |
| 2013/0249544 | A1 * | 9/2013 | Vig | G01B 7/30<br>324/252 |

* cited by examiner

DEVICE AND METHOD FOR MEASURING ROTATION ANGLE OF SPHERICAL HINGE JOINT WITH FOOTBALL-SHAPED STRUCTURE

CROSS-REFERENCE TO RELATED APPLICATION

This patent application claims the benefit and priority of Chinese Patent Application No. 202310516173.8 filed with the China National Intellectual Property Administration on May 9, 2023, the disclosure of which is incorporated by reference herein in its entirety as part of the present application.

TECHNICAL FIELD

The present disclosure belongs to the technical field of precision measurement, relates to the detection technology of two-dimensional angular motion signals of spherical kinetic pairs, and in particular to a device and a method for measuring a rotation angle of a spherical hinge joint with a football-shaped structure.

BACKGROUND

Spherical hinge joint is a commonly used mechanical joint with three degrees of freedom, which has the advantages of compact structure, flexible motion and strong bearing capacity, and has become a key component in mechanical equipment such as parallel mechanisms, industrial robots (robotic arms) and automobile parts. As the motion of the spherical hinge joint is limited by the joint clearance and structural rigidity of the hinge, etc., the caused motion error affects the transmission accuracy of the system, so it is necessary to detect a spatial revolving angle of the spherical hinge for system error prediction, analysis, feedback and compensation, which is conducive to the optimization of motion mechanism control.

A measurement object of the spatial revolving angle of the spherical hinge joint is a spherical rotor that rotates with three degrees of freedom around the center of the sphere in a constrained ball socket. The traditional single-degree-of-freedom angular displacement detection method is difficult to be directly applied. At present, the motion pose measurement of the spherical rotor can be divided into a contact type and a non-contact type according to the measurement methods. The main representative of the contact type measurement scheme is that a sliding rail support mechanism and three rotary encoders are used to decouple a measurement structure and transform the measurement into a single-degree-of-freedom measurement problem. The non-contact type measurement structure is mainly designed based on the principles of optical sensors, visual sensors and Hall sensors, and the decoupling measurement of the multi-degree-of-freedom angular displacement is realized from data processing. However, the system to be constructed by these detection methods is more complicated, and the processing of the measurement data is difficult, and the measurement can be performed only by rotation in a small angle range. Moreover, in practical application, there are higher requirements for installation space and working environment, etc., large cost is needed, and the research scheme has obvious limitations.

SUMMARY

An objective of the present disclosure is to provide a spherical hinge joint capable of measuring a spatial two-dimensional rotation angle for the shortcomings in the prior art. Based on the principle that the change of facing area between spherical capacitor plates leads to the change of output capacitance, the spherical capacitor plates are arranged in a football-like distribution on the basis of an ordinary spherical hinge joint, with a goal of achieving the detection of spatial large-scale rotation angle of the spherical hinge joint, and thus the measurement of a spatial two-dimensional rotation angle of the spherical hinge joint is achieved structurally.

A device for measuring a rotation angle of a spherical hinge joint with a football-shaped structure includes a driving electrode and an induction electrode system. During measurement, the driving electrode and the induction electrode system are both installed in a measured spherical hinge joint, the spherical hinge joint includes a ball socket base, and a ball head installed in the ball socket base. The driving electrode is fixed to the ball head, and the induction electrode system is fixed into the ball socket base.

The induction electrode system includes multiple regular hexagonal spherical electrode plates, and one or more regular pentagonal spherical electrode plates. Five regular hexagonal spherical electrode plates are all arranged around any one regular pentagonal spherical electrode plate, respective regular hexagonal spherical electrode plates and respective regular pentagonal spherical electrode plates are assembled to form a spherical shell structure. There is no conduction between each regular hexagonal spherical electrode plate and an adjacent regular pentagonal spherical electrode plate or regular hexagonal spherical electrode plate thereof. There is no conduction between the driving electrode and the induction electrode system.

During operation, a capacitance structure is formed between the driving electrode and an opposite regular pentagonal spherical electrode plate and/or regular hexagonal spherical electrode plate thereof. When the driving electrode rotates along with the ball head, a capacitance value between the regular pentagonal spherical electrode plate and/or the regular hexagonal spherical electrode plate opposite to the driving electrode changes, thus, according to capacitance values of different electrode plates in the induction electrode system, and a position of the driving electrode in the ball socket, a rotation angle of the ball head can be measured.

In some embodiments, the driving electrode, all regular hexagonal spherical electrode plates and the regular pentagonal spherical electrode plates are led out to a capacitance detection device by wires, respectively. The capacitance detection device can detect a capacitance value between any regular hexagonal spherical electrode plate or regular pentagonal spherical electrode plate and the driving electrode.

In some embodiments, each regular hexagonal spherical electrode plate and the adjacent regular pentagonal spherical electrode plate or regular hexagonal spherical electrode plate thereof are arranged at intervals.

In some embodiments, the driving electrode is in a shape of a spherical cap.

In some embodiments, a clearance d is provided between the driving electrode and the induction electrode system, and $d \leq 200$ μm.

In some embodiments, a connecting rod extending out of the ball socket base is fixed to the ball head. The driving electrode is located at a position, farthest away from the connecting rod, of the ball head.

In some embodiments, an edge diameter of the driving electrode is equal to an inscribed circle diameter of the regular hexagonal spherical electrode plate.

In some embodiments, each regular hexagonal spherical electrode plate and the adjacent regular pentagonal spherical electrode plate or regular hexagonal spherical electrode plate thereof are spaced by an equipotential ring.

In some embodiments, the regular pentagonal spherical electrode plate and the regular hexagonal spherical electrode plate have equal side lengths.

In a second aspect, a method for measuring a rotation angle of a spherical hinge joint with a football-shaped structure is provided, and the above-mentioned device for measuring a rotation angle of a spherical hinge joint is used for measurement. Each regular pentagonal spherical electrode plate and five regular hexagonal spherical electrode plates around the regular pentagonal spherical electrode plate form one detection unit. Two adjacent detection units share two regular hexagonal spherical electrode plates.

The method for measuring a rotation angle of a spherical hinge joint includes following steps.

Step one. An absolute coordinate system is established by with a spherical center position of an induction electrode system as a coordinate origin. A sub-coordinate system is established for each detection unit. A coordinate origin of the sub-coordinate system is coincided with the coordinate origin of the absolute coordinate system. A z-axis direction of the sub-coordinate system is a direction from the spherical center position of the induction electrode system to a center position of a corresponding regular pentagonal spherical electrode plate.

Step two. A target detection unit for measurement is determined

Output capacitance values of all detection units are calculated, respectively. An output capacitance value of each detection unit is a sum of the capacitance values between a regular pentagonal spherical electrode plate as well as respective regular hexagonal spherical electrode plates corresponding to the detection unit and the driving electrode. A detection unit with a maximum output capacitance value is set as the target detection unit.

Step three. A declination angle ($\gamma$, $\beta$) of the driving electrode (3) with respect to the sub-coordinate system corresponding to the target detection unit is acquired.

3-1. According to the capacitance values between the regular pentagonal spherical electrode plate as well as respective regular hexagonal spherical electrode plates in the target detection unit and the driving electrode, overlapping areas $S_0$-$S_5$ of the driving electrode with one regular pentagonal spherical electrode plate and five regular hexagonal spherical electrode plates is calculated.

3-2. Coordinates of a center position of the driving electrode in the sub-coordinate system corresponding to the target detection unit are determined according to the overlapping areas $S_0$-$S_5$.

3-3. Declination angles ($\gamma$, $\beta$) between the center position of the driving electrode and the z axis of the sub-coordinate system are calculated according to the coordinates of the center position of the driving electrode in the sub-coordinate system corresponding to the target detection unit, where $\gamma$ is a declination angle of the center position of the driving electrode around the x axis of the sub-coordinate system, and $\beta$ is a declination angle of the driving electrode around the y axis of the sub-coordinate system.

Step four. A measurement value ($\gamma_{sum}$, $\beta_{sum}$) of the rotation angle of the spherical hinge joint is acquired, $\gamma_{sum}=\gamma+\gamma_0$, $\beta_{sum}=\beta+\beta_0$, where $\gamma_0$ is a declination angle of the sub-coordinate system corresponding to the target detection unit, with respect to the absolute coordinate system, around the x axis of the absolute coordinate system, and $\beta_0$ is a declination angle of the sub-coordinate system corresponding to the target detection unit, with respect to the absolute coordinate system, around the y axis of the absolute coordinate system.

The present disclosure has the beneficial effects that:

1. By employing the principle of a capacitance sensor, the device has the advantages of simple structure, high detection accuracy, fast dynamic response, and simple operation, the measurement efficiency is effectively improved, the measurement operation is convenient, and the measurement cost is reduced while ensuring measurement accuracy.
2. The induction electrode system employs a football-shaped layout, and thus a spatial large-range rotation angle measurement of a spherical hinge joint can be obtained, and accumulated errors can be effectively avoided.
3. When the rotation angle is analyzed, the sub-coordinate system and the absolute coordinate system can be converted by space division, thus effectively simplifying the analysis. In addition, the device is compact in structure and has low requirement on the installation space of the measurement device.

DETAILED DESCRIPTION OF THE EMBODIMENTS

The present disclosure is further described below with reference to accompanying drawings.

Figure 1:
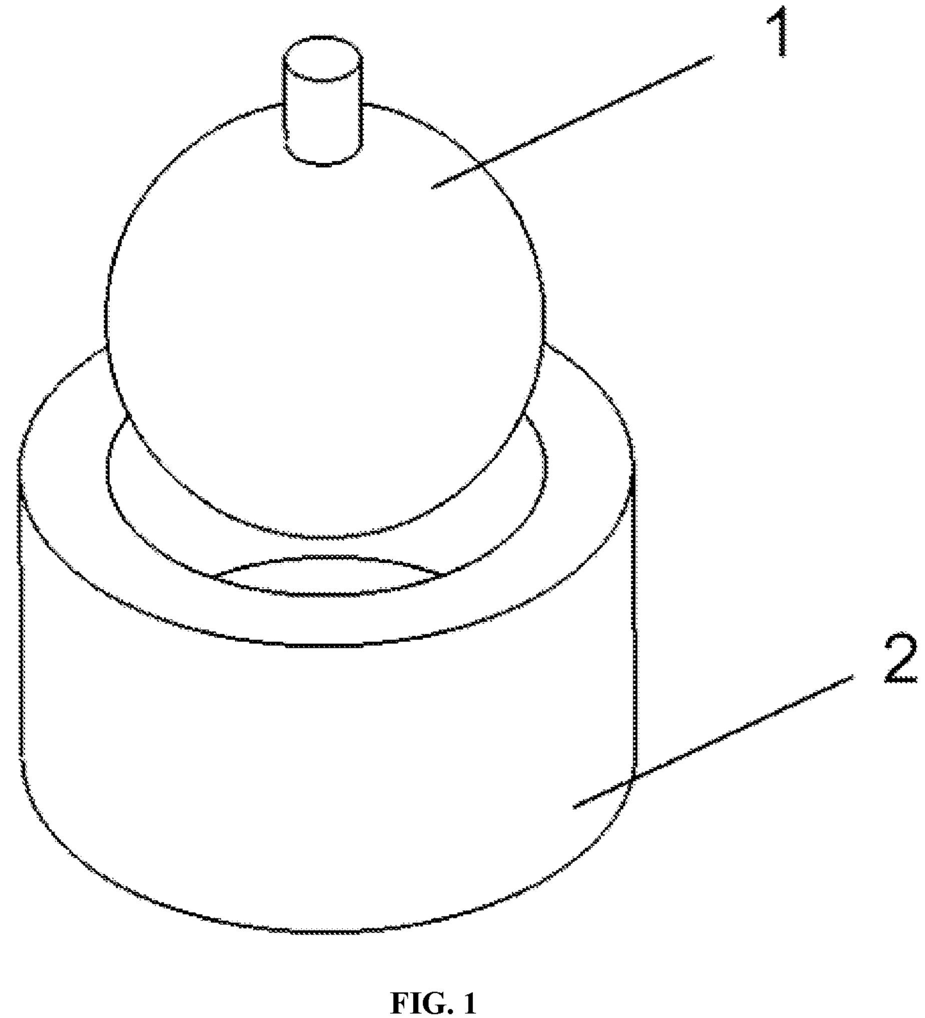
FIG. 1 is a schematic diagram of a spherical hinge joint according to the present disclosure.

As shown in FIG. 1, a device for measuring a rotation angle of a spherical hinge joint with a football-shaped structure is installed in a spherical hinge joint and configured to measure two-degree-of-freedom rotation angular displacement of the spherical hinge joint. The spherical hinge joint includes a ball socket base 2, and a ball head 1 installed in the ball socket base 2 to form a spherical pair.

Figure 2:
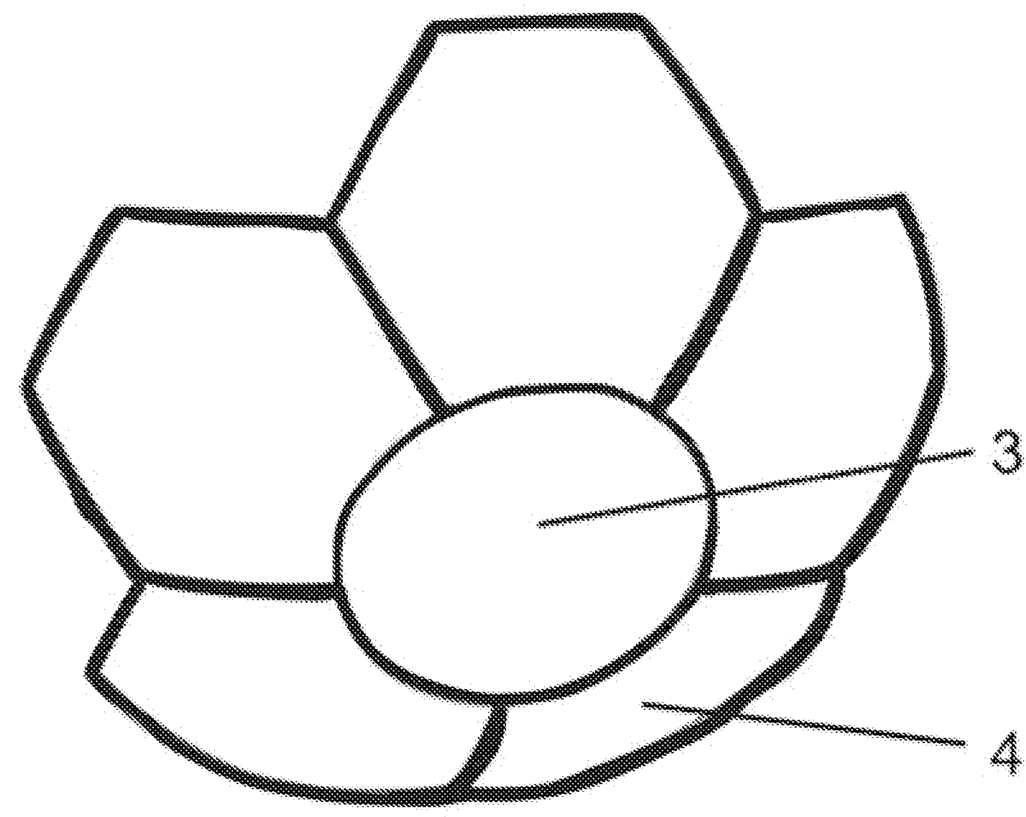
FIG. 2 is a schematic diagram showing interaction between a driving electrode and an induction electrode system according to the present disclosure.

As shown in FIG. 2, a device for measuring a rotation angle of a spherical hinge joint with a football-shaped structure includes a driving electrode 3 fixed to the ball head 1, and an induction electrode system 4 fixed into the ball socket base 2. The driving electrode 3 is located at a position, farthest away from the connecting rod, of the ball head 1. The driving electrode 3 is in the shape of a partial spherical cap and is concentrically installed. A clearance d is formed between the driving electrode 3 and the induction electrode system 4, that is, it is necessary to ensure that a radius of curvature of the outer surface of the driving electrode 3 is smaller than that of the inner surface of the induction electrode system 4, $d \leq 200$ µm. The clearance d between the driving electrode 3 and the induction electrode system 4 is used to ensure that there is no conduction between the driving electrode 3 and the induction electrode system 4. By air flotation, insulating lubricating liquid is filled, and a solid dielectric layer is arranged on the adjacent side faces of the driving electrode 3 and the induction electrode system 4 (the solid dielectric layer can be fixed to both the driving electrode 3 and the induction electrode system 4), or can be maintained by other modes in the prior art.

The induction electrode system 4 includes multiple regular hexagonal spherical electrode plates 5 and multiple regular pentagonal spherical electrode plates 6. Various regular hexagonal spherical electrode plate 5 and various regular pentagonal spherical electrode plates 6 are arranged in a football-like structure, which are assembled to form a local spherical shell with a gap that is attached to the inner surface of the ball socket base 2. The regular pentagonal spherical electrode plate 6 and the regular hexagonal spherical electrode plate 5 have equal side lengths. Five regular hexagonal spherical electrode plates 5 are arranged around any one regular pentagonal spherical electrode plate 6, and the side surfaces, facing a spherical center position of the ball socket base 2, of the pentagonal spherical electrode plate and the hexagonal spherical electrode plate are both located on a same spherical surface.

Each regular hexagonal spherical electrode plate 5 and an adjacent regular pentagonal spherical electrode plate 6 or regular hexagonal spherical electrode plate 5 thereof are arranged at intervals, thus ensuring that there is no conduction between all regular hexagonal spherical electrode plates 5 and the regular pentagonal spherical electrode plate 6.

Figure 3:
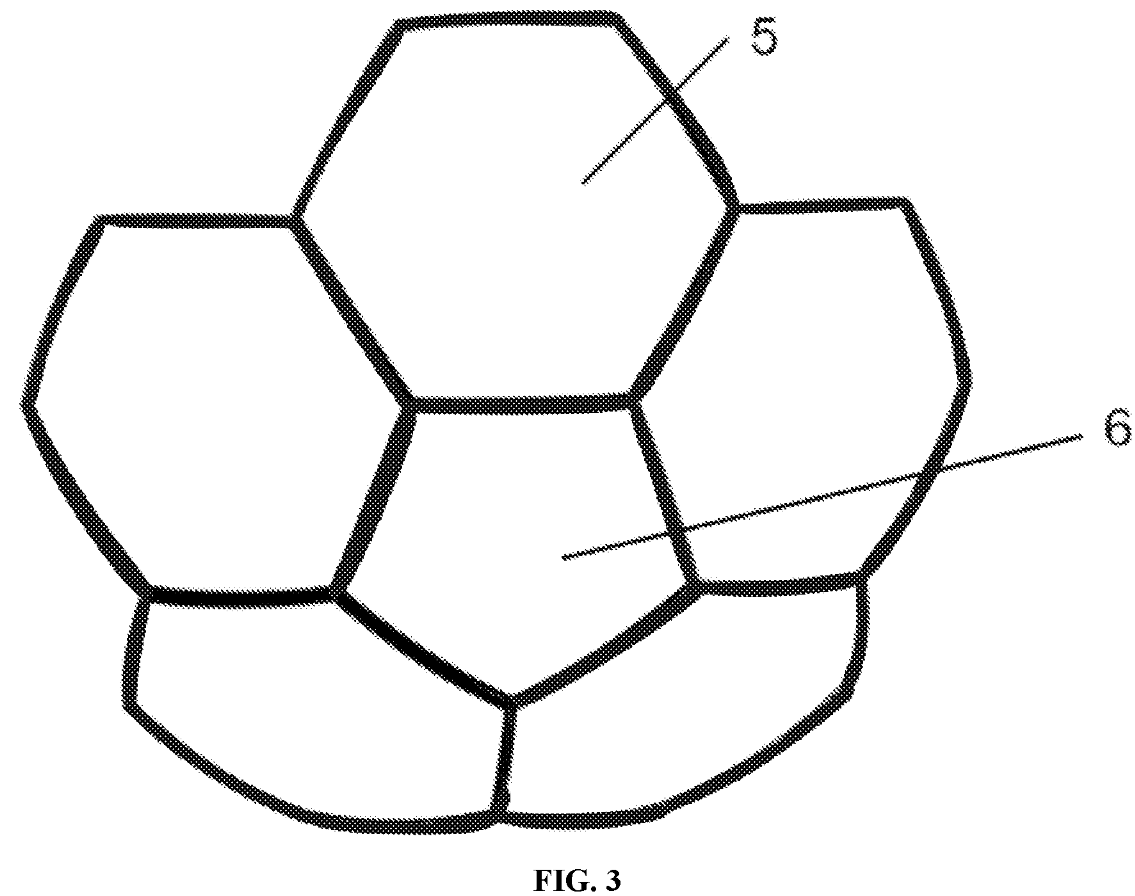
FIG. 3 is a schematic diagram of an induction electrode system combination according to the present disclosure.
Figure 4:
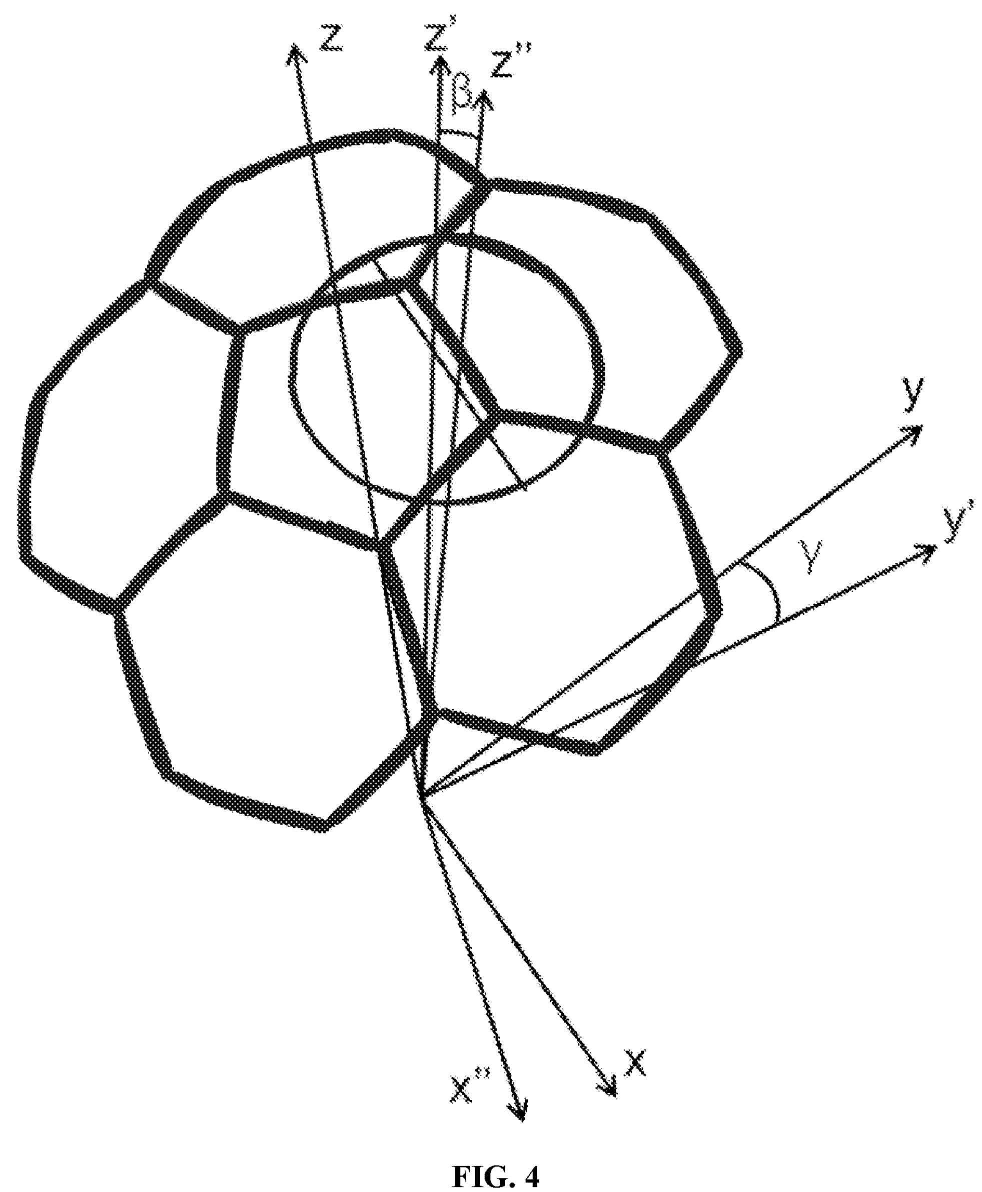
FIG. 4 is a schematic diagram of a spatial rotation angle of the driving electrode according to the present disclosure.

As shown in FIG. 3, an edge diameter of the driving electrode 3 is equal to an inscribed circle diameter of the regular hexagonal spherical electrode plate 5.

In this embodiment, a preferred and unnecessary technical solution is provided. The edges of all the regular hexagonal spherical electrode plates 5 and the regular pentagonal spherical electrode plates 6 are sheathed with equipotential rings, so as to reduce the influence of edge effects on the detection result.

In this embodiment, a preferred and unnecessary technical solution is provided, and the electrode plate is made of a material with good conductivity, such as copper and silver. A housing is made of a material that is easy to be manufactured and difficult to be conductive, such as PVC plastic, or structural steel coated with insulating coatings on the surface.

Each regular pentagonal spherical electrode plate 6 and five regular hexagonal spherical electrode plates 5 around the regular pentagonal spherical electrode plate form one detection unit. Two adjacent detection units share two regular hexagonal spherical electrode plates 5. Under such a structure, the driving electrode 3 must be within the range of one of the detection units.

When the induction electrode system 4 and the driving electrode 3 are in a spatial rotation in the spherical hinge joint, a position of the driving electrode 3 in the induction electrode system 4 changes, and the facing area between the driving electrode 3 and the regular hexagonal spherical electrode plate 5 and the regular pentagonal spherical electrode plate 6 in the induction electrode system 4 changes.

A computation formula of capacitance C is as follows:

$$C = \frac{\varepsilon S}{d}$$

ε is a dielectric constant, which is only related to the property of a substance between electrode plates, S is the facing area between the electrode plates, and d is the distance between the electrode plates.

According to the principle of the capacitance sensor, when the facing area between the electrode plates changes, the output capacitance value also changes. According to this principle, the spatial rotation angle of the spherical hinge joint can be calculated from the output capacitance value change. The calculating process is described below.

A spatial fixed coordinate system OXYZ is established with the center of a ball socket as a coordinate origin and a spatial gravity direction as the Z axis. A spatial rectangular coordinate system oxyz with a center position of the ball socket as a coordinate origin is established for each detection unit. A direction from the coordinate origin to a center position of the corresponding regular pentagonal spherical electrode plate 6 is used as a Z-axis direction of the spatial rectangular coordinate system. The driving electrode 3, when moving in the space, may be in contact with the regular pentagonal spherical electrode plates 6 in two systems at the same time, at this time, the overlapping area of the driving electrode 3 and the regular pentagonal spherical electrode plates 6 of the two systems is used as the standard for selecting a measurement system, that is, a measurement system centered on the pentagonal spherical electrode plate with a large capacitance output value is used for measurement.

The overlapping area of the driving electrode 3 and the regular pentagonal spherical electrode plate 6 and five regular hexagonal spherical electrode plates 5 in the induction electrode system 4 are $S_0$, $S_1$, $S_2$, $S_3$, $S_4$ and $S_5$, respectively. Six capacitance values output by the regular pentagonal spherical electrode plate 6 and the five regular hexagonal spherical electrode plates 5 of the induction electrode system 4 are $C_0$, $C_1$, $C_2$, $C_3$, $C_4$ and $C_5$, respectively. From the calculation formula of the capacitance, the capacitance of each corresponding surface can be expressed as follows:

$$C_i = \frac{\varepsilon S_i}{d}(i = 0, 1, 2, 3, 4, 5)$$

The overlapping area $S_i$ can be obtained through the capacitance value:

$$S_i = \frac{C_i d}{\varepsilon}(i = 0, 1, 2, 3, 4, 5)$$

Figure 5:
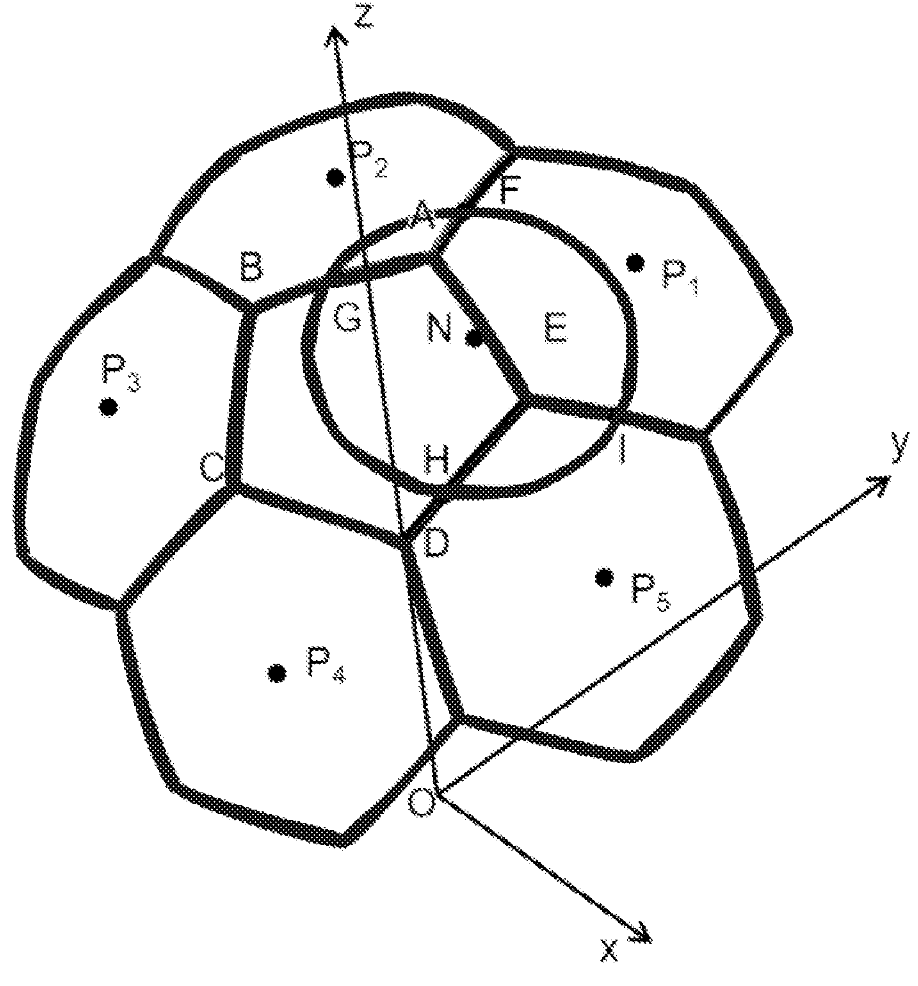
FIG. 5 is a schematic diagram of coordinate system transformation for solving a rotation angle according to the present disclosure.

As shown in FIG. 5, a mathematical model of the overlapping area between the driving electrode 3 and the electrode plates of the induction electrode system 4 is established. In the figure, the driving electrode 3 is a spherical cap part where the spherical surface is intercepted by a plane, the regular pentagonal spherical electrode plate 6 in the induction electrode system 4 is obtained by intercepting a regular pentagonal cylinder and the spherical surface, and the regular hexagonal spherical electrode plate 5 is obtained by intercepting a regular hexagonal cylinder and the spherical surface, so the three curved surfaces can be expressed by mathematical expressions, which are not shown here because the formulas are complicated. As the clearance d between the driving electrode 3 and the induction electrode system 4 is small, the radius of curvature of the outer surface of the driving electrode 3 and the radius of curvature of the inner surface of the induction electrode system 4 are considered to be the same when calculating the area, and both are set as r.

Angular points of the regular pentagonal spherical electrode plate 6 are set to be A, B, C, D and E, respectively, and intersection points of sidelines of the driving electrode 3 and the regular pentagonal spherical electrode plate 6 and the regular hexagonal spherical electrode plate 5 in the induction electrode system 4 are denoted as F, G, H and I, respectively, at this time, there are overlapping areas between the four pairs of electrode plates, which can be expressed as:

$$\begin{cases} S_0 = S_{AGHE} = \iint\limits_{AGHE} 1dS \\ S_1 = S_{AEIF} = \iint\limits_{AEIF} 1dS \\ S_2 = S_{AFG} = \iint\limits_{AFG} 1dS \\ S_3 = 0 \\ S_4 = 0 \\ S_5 = S_{EHI} = \iint\limits_{EHI} 1dS \end{cases}$$

The above-mentioned equations are nonlinear equations and can constitute a statically indeterminate equation set. In a Matlab software optimization toolbox, fsolve function is based on the least square method and can be used to solve a nonlinear equation set. After a suitable initial value is given, a good iterative effect can be obtained to meet a convergence condition. Through the area expression, the coordinates of the points F, G, H and I are solved as F ($x_f$, $y_f$, $z_f$), G ($x_g$, $y_g$, $z_g$), H ($x_h$, $y_h$, $z_h$) and I ($x_i$, $y_i$, $z_i$), respectively. The coordinates of the four points, after being determined, are substituted into a spherical circle equation:

$$(x-a)^2+(y-b)^2+(z-c)^2=r^2$$

where r is a radius of the sphere, and after an edge analytical expression of the driving electrode 3 is determined, the center position of the driving electrode 3 can be determined as N' (a, b, c). A normal vector of a plane where a rotated circular trajectory is located is $\vec{p}$=(a, b, c), and a vector of an initial plane is $\vec{z}$=(0, 0, 1). A process that the driving electrode 3 reaches a final position from an initial position through spatial rotation is represented by a rotation matrix:

$$(a, b, c) = [0\ 0\ 1]\begin{bmatrix} 1 & 0 & 0 \\ 0 & \cos\gamma & -\sin\gamma \\ 0 & \sin\gamma & \cos\gamma \end{bmatrix}\begin{bmatrix} \cos\beta & 0 & \sin\beta \\ 0 & 1 & 0 \\ -\sin\beta & 0 & \cos\beta \end{bmatrix}$$

In the above-mentioned formula, $\gamma$ is a rotation angle of the spherical hinge joint around the x axis, and $\beta$ is a rotation angle of the spherical hinge joint around the y axis.

The above-mentioned formula is simplified as follows:

$$\begin{cases} -\sin\gamma\sin\beta = a \\ \sin\gamma = b \\ \cos\gamma\cos\beta = c \end{cases}$$

The numerical values of $\gamma$ and $\beta$ can be calculated through above-mentioned formula.

$$\begin{cases} \gamma = \arcsin b \\ \beta = -\arcsin\frac{a}{b} \end{cases}$$

Figure 6:
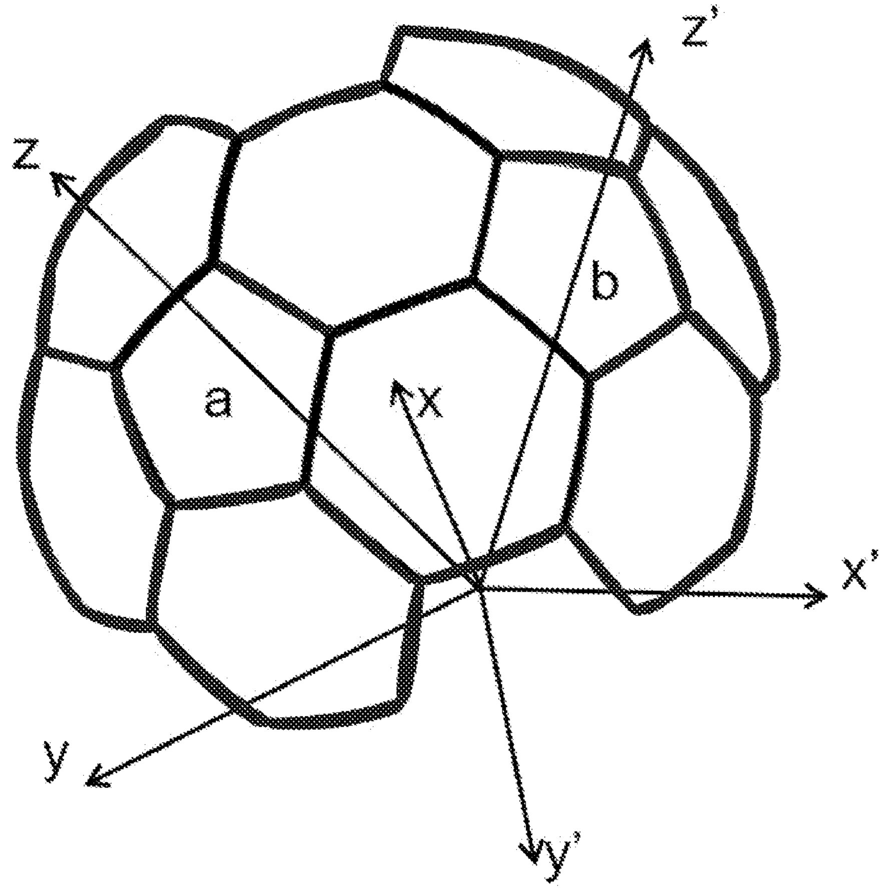
FIG. 6 is a schematic diagram of sub-coordinate systems corresponding to two adjacent detection units according to the present disclosure.

As shown in FIG. 6, because the induction electrode system 4 with the football-shaped layout can be divided into multiple repeated detection units (the regular pentagonal spherical electrode plate and the five regular hexagonal spherical electrode plates around the regular pentagonal spherical electrode plate are regarded as one detection unit).

Different detection units have the same structure, and the only difference is that there is a certain included angle in a spatial position. Therefore, when the driving electrode spatially rotates with the spherical hinge joint, the driving electrode 3 moves from the sub-coordinate system oxyz corresponding to a first detection unit a to the sub-coordinate system o'x'y'z' corresponding to a second detection unit b, the rotation angles in different sub-coordinate systems can be calculated according to the above-mentioned calculation process, and then an actual spatial rotation angle of the spherical hinge joint based on the fixed spatial coordinate system OXYZ can be obtained by adding a fixed spatial included angle between the two coordinate systems.

When the driving electrode intersects with multiple detection units at the same time, the respective detection units can output capacitance values at the same time. At this time, according to the capacitance value output by each detection unit (the sum of the output capacitances of each electrode plate in the detection unit), it is determined which detection unit is used to determine the position of the driving electrode, and the detection unit with the large output capacitance value is used as the reference for measurement.

According to this football-style layout method, the whole spherical surface can be wrapped by a system which combines five regular hexagonal spherical electrode plates around the regular pentagonal spherical electrode plate as the center, so the measurement of the 360° spatial rotation angle of the spherical hinge joint can be theoretically achieved, and accumulated errors can be effectively avoided.

Based on the description above, rotation angles ($\gamma_{sum}$, $\beta_{sum}$) of the driving electrode with respect to the x axis and the y axis of the spatial fixed coordinate system OXYZ can be obtained, $\gamma_{sum}=\gamma+\gamma_0$, $\beta_{sum}=\beta+\beta_0$, where $\gamma_0$ is a declination angle of the sub-coordinate system corresponding to the target detection unit, with respect to the absolute coordinate system, around the x axis of the absolute coordinate system, and $\beta_0$ is a declination angle of the sub-coordinate system corresponding to the target detection unit, with respect to the absolute coordinate system, around the y axis of the absolute coordinate system.

What is claimed is:

1. A device for measuring a rotation angle of a spherical hinge joint with a football-shaped structure, comprising a driving electrode (3) and an induction electrode system (4), wherein during measurement, the driving electrode (3) and the induction electrode system (4) are both installed in a measured spherical hinge joint, the spherical hinge joint comprises a ball socket base (2), and a ball head (1) installed in the ball socket base (2); the driving electrode (3) is fixed to the ball head (1), and the induction electrode system (4) is fixed into the ball socket base (2);

the induction electrode system (4) comprises a plurality of regular hexagonal spherical electrode plates (5), and one or more regular pentagonal spherical electrode plates (6), five regular hexagonal spherical electrode plates (5) are all arranged around any one regular pentagonal spherical electrode plate (6), respective regular hexagonal spherical electrode plates (5) and respective regular pentagonal spherical electrode plates (6) are assembled to form a spherical shell structure; no conduction exists between each regular hexagonal spherical electrode plate (5) and an adjacent regular pentagonal spherical electrode plate (6) or regular hexagonal spherical electrode plate (5) thereof, and no conduction exists between the driving electrode (3) and the induction electrode system (4).

2. The device according to claim 1, wherein the driving electrode, all regular hexagonal spherical electrode plates (5) and the regular pentagonal spherical electrode plates (6) are led out to a capacitance detection device by wires, respectively; the capacitance detection device is able to detect a capacitance value between any regular hexagonal spherical electrode plate (5) or regular pentagonal spherical electrode plate (6) and the driving electrode (3).

3. The device according to claim 1, wherein each regular hexagonal spherical electrode plate (5) and the adjacent regular pentagonal spherical electrode plate (6) or regular hexagonal spherical electrode plate (5) thereof are arranged at intervals.

4. The device according to claim 1, wherein the driving electrode (3) is in a shape of a spherical cap.

5. The device according to claim 1, wherein a clearance d is provided between the driving electrode (3) and the induction electrode system (4), and $d \leq 200$ μm.

6. The device according to claim 1, wherein a connecting rod extending out of the ball socket base is fixed to the ball head (1), and the driving electrode (3) is located at a position, farthest away from the connecting rod, of the ball head (1).

7. The device according to claim 1, wherein an edge diameter of the driving electrode (3) is equal to an inscribed circle diameter of the regular hexagonal spherical electrode plate (5).

8. The device according to claim 1, wherein each regular hexagonal spherical electrode plate (5) and the adjacent regular pentagonal spherical electrode plate (6) or regular hexagonal spherical electrode plate (5) thereof are spaced by an equipotential ring.

9. The device according to claim 1, wherein the regular pentagonal spherical electrode plate (6) and the regular hexagonal spherical electrode plate (5) have equal side lengths.

10. A method for measuring a rotation angle of a spherical hinge joint with a football-shaped structure, comprising following steps:

Step one: establishing an absolute coordinate system with a spherical center position of an induction electrode system (4) as a coordinate origin; establishing a sub-coordinate system for each detection unit, with a coordinate origin of the sub-coordinate system in coincidence with the coordinate origin of the absolute coordinate system and a z-axis direction of the sub-coordinate system being a direction from the spherical center position of the induction electrode system (4) to a center position of a corresponding regular pentagonal spherical electrode plate (6);

Step two: determining a target detection unit for measurement;

calculating output capacitance values of all detection units, respectively; wherein an output capacitance value of each detection unit is a sum of the capacitance values between a regular pentagonal spherical electrode plate (6) as well as respective regular hexagonal spherical electrode plates (5) corresponding to the detection unit and the driving electrode (3), and setting a detection unit with a maximum output capacitance value as the target detection unit;

Step three: acquiring a declination angle ($\gamma$, $\beta$) of the driving electrode (3) with respect to the sub-coordinate system corresponding to the target detection unit;

3-1: according to the capacitance values between the regular pentagonal spherical electrode plate (6) as well as respective regular hexagonal spherical electrode plates (5) in the target detection unit and the driving electrode (3), calculating overlapping areas $S_0$-$S_5$ of the driving electrode (3) with one regular pentagonal spherical electrode plate (6) and five regular hexagonal spherical electrode plates (5);

3-2: determining coordinates of a center position of the driving electrode (3) in the sub-coordinate system corresponding to the target detection unit according to the overlapping areas $S_0$-$S_5$;

3-3: calculating declination angles ($\gamma$, $\beta$) between the center position of the driving electrode (3) and the z axis of the sub-coordinate system according to the coordinates of the center position of the driving electrode (3) in the sub-coordinate system corresponding to the target detection unit, wherein $\gamma$ is a declination angle of the center position of the driving electrode (3) around the x axis of the sub-coordinate system, and $\beta$ is a declination angle of the driving electrode (3) around the y axis of the sub-coordinate system; and Step four: acquiring a measurement value ($\gamma_{sum}$, $\beta_{sum}$) of the rotation angle of the spherical hinge joint, $\gamma_{sum}=\gamma+\gamma_0$, $\beta_{sum}=\beta+\beta_0$, wherein $\gamma_0$ is a declination angle of the sub-coordinate system corresponding to the target detection unit, with respect to the absolute coordinate system, around the x axis of the absolute coordinate system, and $\beta_0$ is a declination angle of the sub-coordinate system corresponding to the target detection unit, with respect to the absolute coordinate system, around the y axis of the absolute coordinate system.

* * * * *